June 10, 1958 P. GARINE 2,838,590
COMPOSITE ELECTRODE FOR ELECTRIC BATTERIES AND METHOD OF MAKING SAME
Filed March 7, 1955
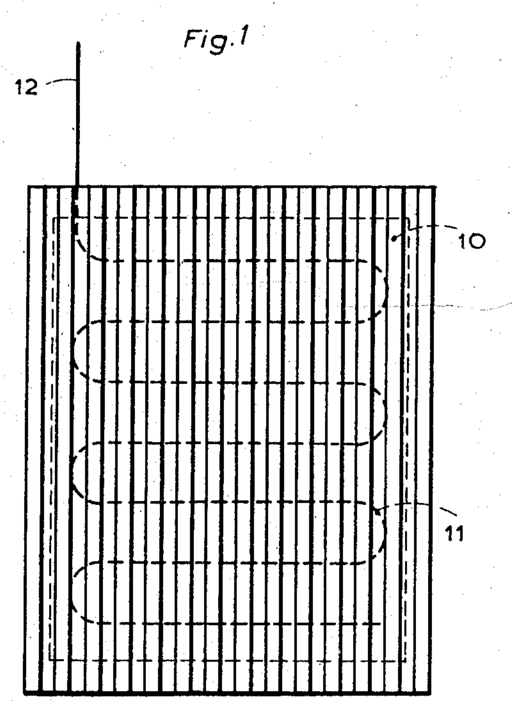
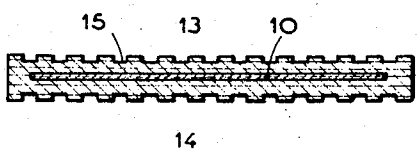
Fig. 2
PAUL GARINE
INVENTOR.
BY Karl F. Ross
AGENT United States Patent Office 2,838,590

Patented June 10, 1958

2,838,590

COMPOSITE ELECTRODE FOR ELECTRIC BATTERIES AND METHOD OF MAKING SAME

Paul Garine, Paris, France, assignor to Yardney International Corp., New York, N. Y., a corporation of New York Application March 7, 1955, Serial No. 492,630

2 Claims. (Cl. 136—30)

This invention relates to improvements in electric batteries of the type using active substances in powder form.

It has long been known to utilize an active substance in finely divided form, as a powder or paste, in order to derive benefit from the increased reactive capacity resulting from the divided condition of the active substance.

While such batteries have found extensive use heretofore, especially as storage batteries or accumulators, they possess certain drawbacks. In the first place, the manufacture of such electrodes is sometimes made difficult by the non-rigid character of the active substance. Moreover, means have to be provided for imparting to the electrodes made of finely divided material the requisite dimensional stability for the construction of a storage battery. This dimensional stability is usually obtained by wrapping the electrode in sheet material. Finally, it may happen during the operation of such batteries that the divided active substance has a tendency to drop by gravity to the bottom of the container or casing containing the electrodes, thereby gradually reducing the capacity of the battery and producing a danger of short circuits.

It is an object of the invention to provide a battery wherein the shape of the body of comminuted material is effectively maintained and there is no danger of a migration of particles towards the bottom of the container even over prolonged periods of operation, and even under service conditions involving vibrations and shocks.

It is also an object of the invention to provide a battery wherein the electrochemically active substance in comminuted form does not require wrapping in sheet material, thereby facilitating manufacture and tending to reduce the internal resistance of the battery.

It is another object to provide a method of producing a battery electrode from comminuted material which is easy to preform and is amenable to mass production methods.

In accordance with the invention, an electro-chemically active substance for an electrode of a battery is agglomerated with the aid of a synthetic resin or some equivalent plastic material.

For producing an electrode in accordance with the invention, a comminuted electrochemically active substance is mixed with a synthetic material, such as a resin, in liquid or semi-liquid form, thus in dissolved or molten condition; after shaping, the material is allowed to set, as by a simple evaporation of the solvent of the synthetic material or by cooling.

The shaping operation may be effected in any known way, as by casting, pouring, spreading, spraying, coating, compression or injection, molding, or calendering.

Preferably a core or web of sheet material is incorporated in an electrode according to the invention. The core may consist of an electrochemically inert and nonconductive material such as paper, nylon, etc. Alternatively, the core may consist of a piece of wire mesh or netting so as to serve as a current collector means. In either case, the core may be applied in such manner as to support the current input and output conductor.

The invention is advantageously applied to batteries or accumulators of the silver-zinc type with an alkaline electrolyte.

There are two broad types of silver-zinc batteries: In the first type the zinc is initially in the form of a sheet or plate and is adapted during the successive charging and discharging cycles to be converted into pulverulent form. The battery obtained on completion of this forming stage is particularly adapted for use in cases where great endurance and long life are required. In the other type the so-called negative electrode is prepared from zinc oxide powder. The duration of the forming period of the battery is then greatly reduced and the battery immediately yields a capacity approximating its nominal capacity, but the endurance is lower than in the first type just described.

The ensuing description made by way of example with reference to the accompanying drawing relates to a silver-zinc accumulator and more especially to a zinc electrode for such an accumulator. An alkaline battery having zinc electrodes made in accordance with the invention possesses the advantageous features of both types of battery just noted. The drawing shows such an electrode in elevation (Fig. 1) and in cross section (Fig. 2).

In preparing such an electrode the following procedure may be followed: Zinc oxide powder or, alternatively, zinc metal powder is mixed with a plastic material such as a synthetic resin. Excellent results have been obtained with the use of the synthetic resin known as polystyrol or polystyrene or styrolene. Prior to mixing, the synthetic resin is preliminarily dissolved in a solvent such as benzene. The zinc oxide powder is thus thoroughly mixed with a benzene solution of polystyrene. A pasty mass is obtained of more or less compact consistency, depending on the amount of solvent used. This mass is shaped and after solvent evaporation provides the electrode.

For example, a coat of the paste comprising the mixed zinc oxide and polystyrol may be spread over the surface of a flanged plate (not shown). One or more cores of nylon, paper or similar sheet material are then laid over the coating, the cores having been preliminarily cut out to the final shape of the desired electrode and having disposed thereon a conductor wire for the input and take-off of electric current. Thus, referring to the accompanying drawing, a nylon sheet core element 10, cut to a rectangular form, may have a length of conductor wire 11, e. g. silver, laid thereover in the wavy path illustrated, or alternatively in the form of a grid, network, lattice, etc. The coat is placed over the coat of paste and a fresh coat of the paste is spread over it. The solvent is then allowed to evaporate completely, which may require a variable length of time depending on the temperature and the solvent concentration in the paste. A comparatively rigid plate or slab is thus obtained. This plate may then, if desired, be cut into a plurality of smaller plates or strips. Each such strip is self-supporting and dimensionally stable, and can be handled and placed in a container to constitute an electrode for a battery. Moreover, while highly rigid, such an electrode possesses substantial porosity.

Preferably a set of grooves may be formed in the larger sides of the plate or strip before it has completely set, so as further to increase the active area and to provide ducts or passages for the penetration of the electrolyte as well as for discharge of any gases evolved during the electrochemical reactions.

The outgoing lead or leads such as 12 serve to connect the electrode in the usual way into an electric circuit. As shown in Fig. 2, the electrode is in the form of a thin rectangular strip having grooves 15 formed in its larger sides 13 and 14. The drawing is not necessarily to scale since the strip-like electrodes according to the invention may be much thinner than would appear from the drawing.

Electrodes produced in the manner described may be formed with a much smaller thickness than could be attained heretofore, and this will, in many cases, provide highly advantageous results. Such an electrode may be used without having to be wrapped or surrounded with separator sheets (e. g. made of cellophane sheeting) as in conventional practice. The zinc electrode shown in the drawing may be used in cooperation with positive electrodes of, for example, silver. The silver electrodes may have been produced in a conventional manner and surrounded or wrapped with semi-permeable sheet material as cellophane, or they may also have been prepared by the method of the invention as described hereinabove.

The method is likewise applicable to the production of electrodes made from lead oxide, nickel, or ferro-cadmium.

I claim:

1. A process for making an electrode for electrochemical batteries which comprises the steps of mixing zinc oxide powder with a solution of polystyrene into a paste, molding said paste into a platelike electrode body and causing said body to harden by the evaporation of a solvent from the solution.

2. An electrode for electrochemical batteries, comprising a platelike body of a zinc oxide-polystyrene mixture produced by mixing zinc oxide powder with a polystyrene solution into a paste, molding said paste into said body and causing said body to harden by the evaporation of a solvent from the solution.

References Cited in the file of this patent

UNITED STATES PATENTS

| | | |
|---|---|---|
| 2,561,943 | Moulton et al. | July 24, 1951 |
| 2,677,713 | Weil et al. | May 4, 1954 |
| 2,692,904 | Strauss | Oct. 26, 1954 |
| 2,738,375 | Schlotter | Mar. 13, 1956 |

FOREIGN PATENTS

| | | |
|---|---|---|
| 1,012,439 | France | Apr. 16, 1952 |

UNITED STATES PATENT OFFICE

CERTIFICATE OF CORRECTION

Patent No. 2,838,590 June 10, 1958

Paul Garine

It is hereby certified that error appears in the above numbered patent requiring correction and that the said Letters Patent should read as corrected below.

In the heading of the printed specification, between lines 7 and 8, insert -- Claims priority, application France March 12, 1954 --.

Signed and sealed this 31st day of March 1959.

(SEAL)
Attest:
KARL H. AXLINE
Attesting Officer

ROBERT C. WATSON
Commissioner of Patents